G. W. OGAN.
KILN FOR BURNING CLAY PRODUCTS AND THE LIKE.
APPLICATION FILED JAN. 3, 1914.
1,147,117.
Patented July 20, 1915.
5 SHEETS—SHEET 3.
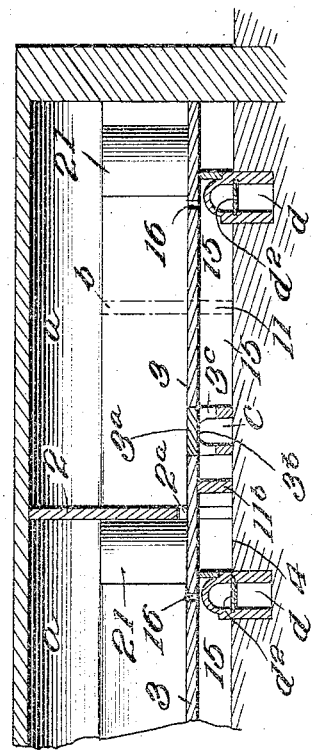

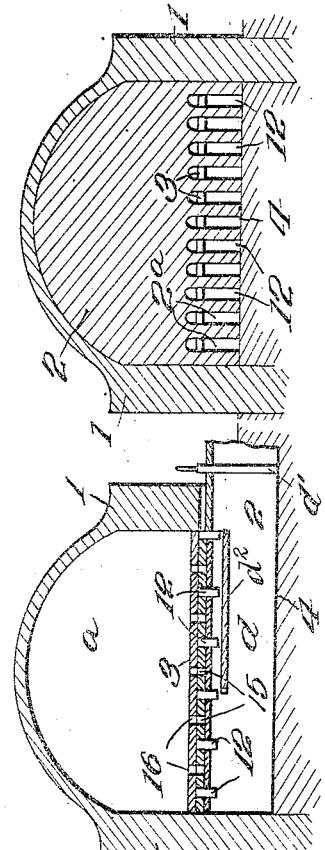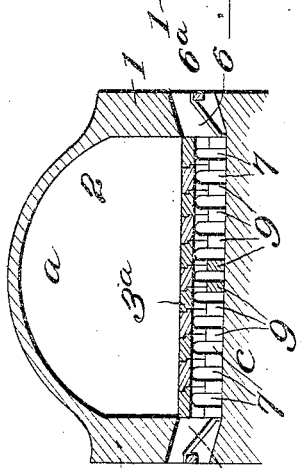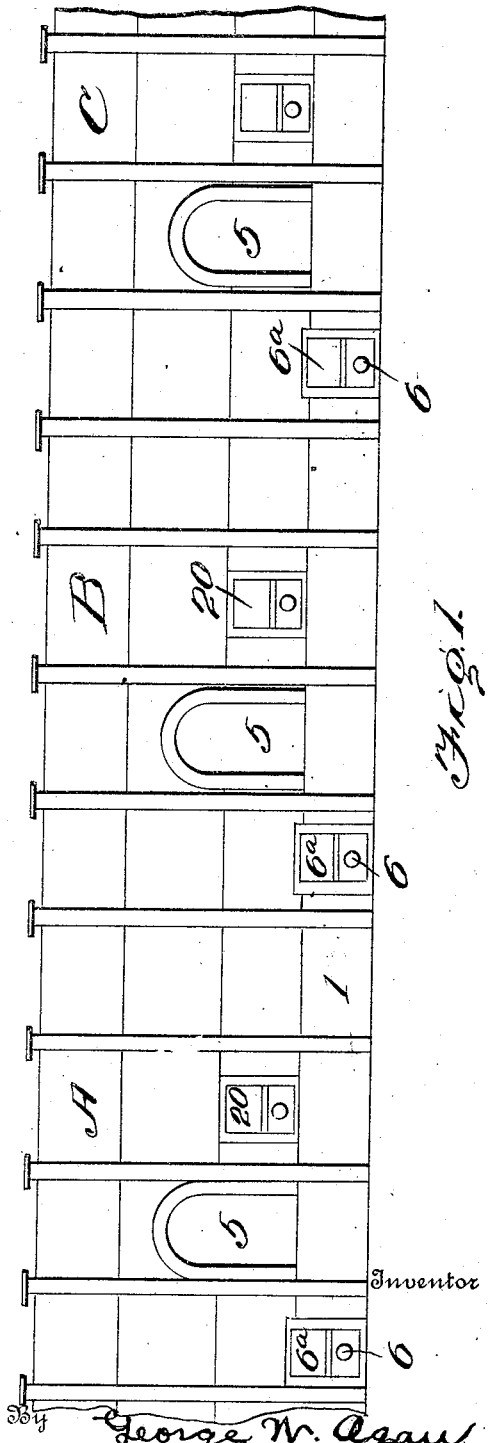

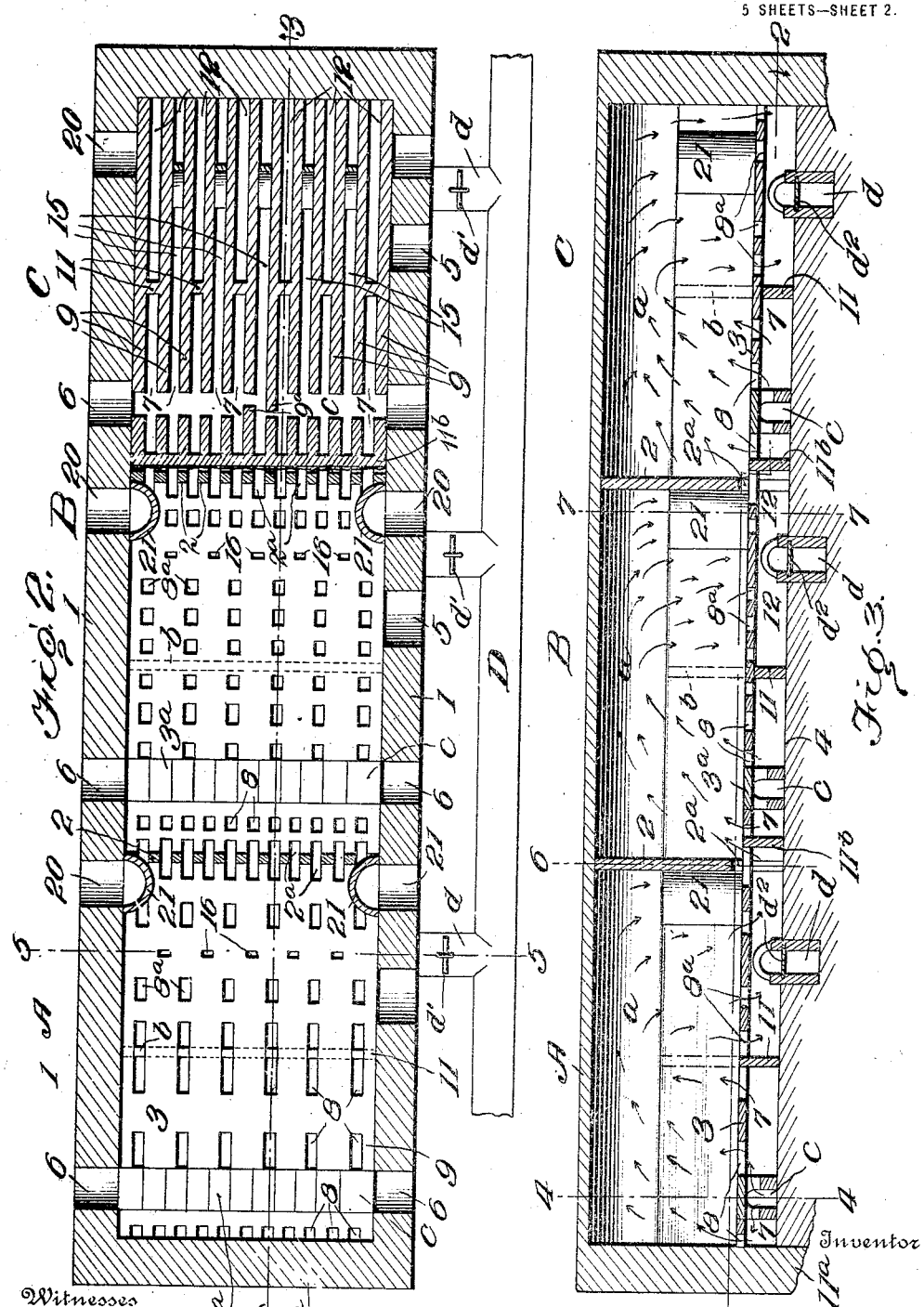

G. W. OGAN.
KILN FOR BURNING CLAY PRODUCTS AND THE LIKE.
APPLICATION FILED JAN. 3, 1914.
1,147,117.
Patented July 20, 1915.
5 SHEETS—SHEET 4.
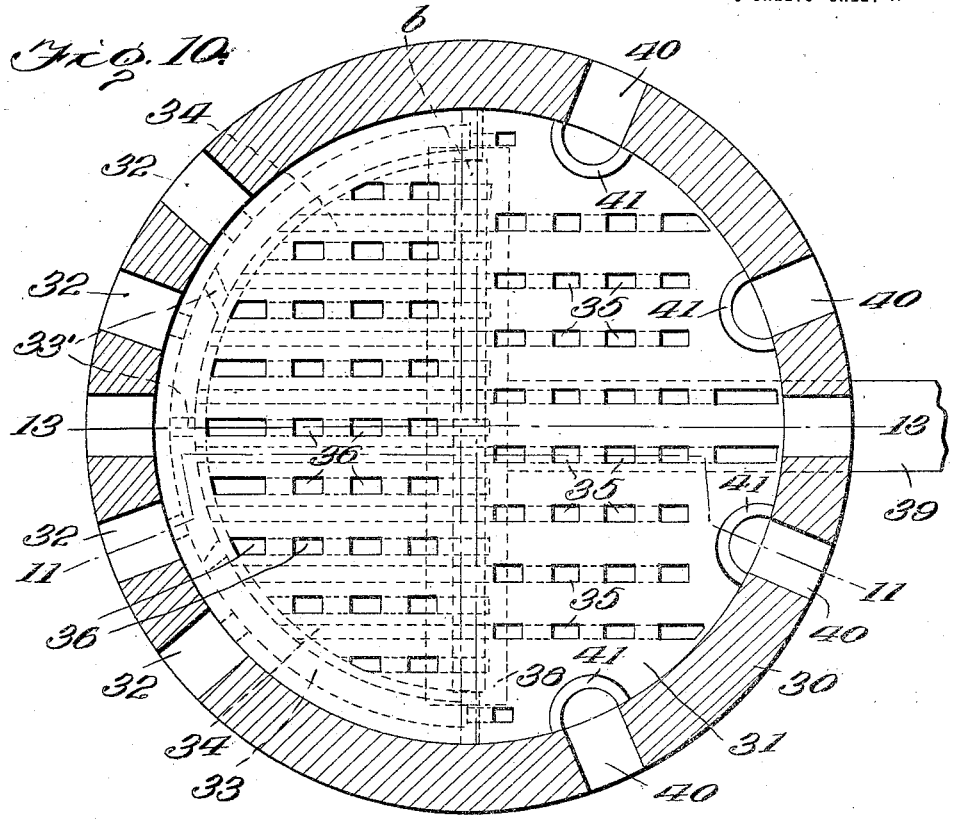
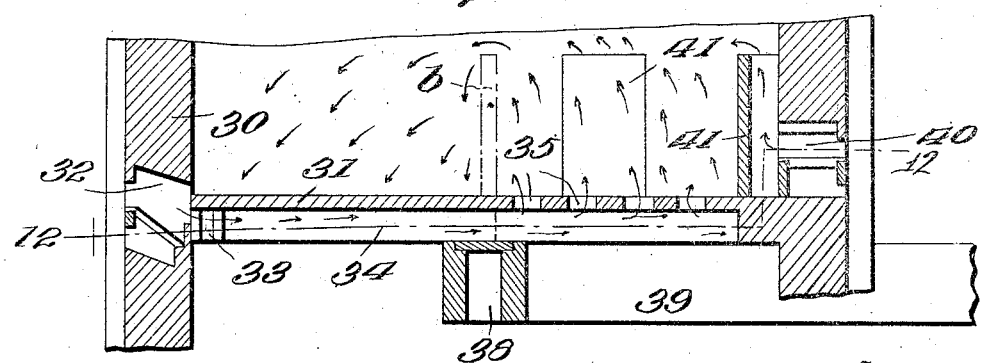

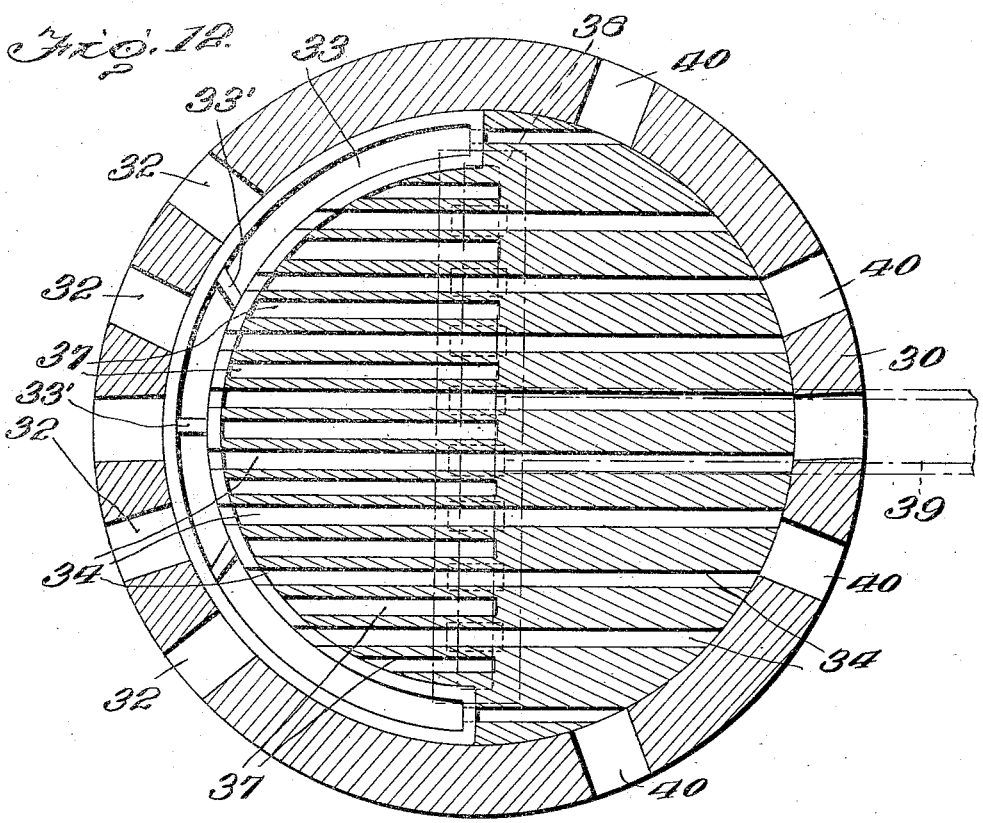
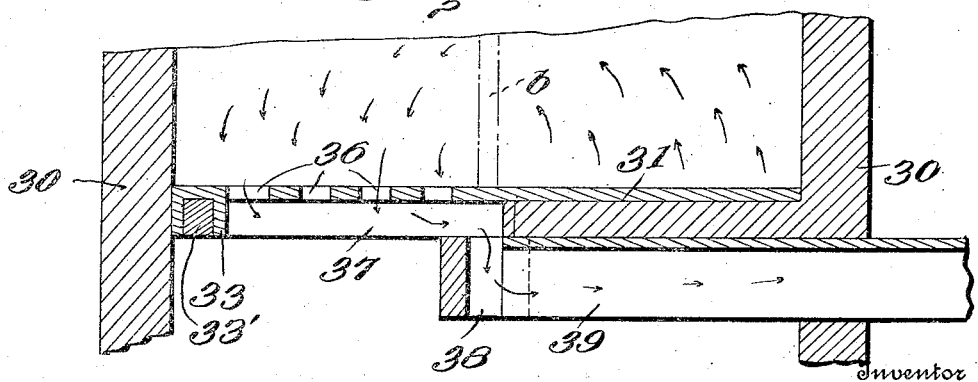

UNITED STATES PATENT OFFICE.

GEORGE W. OGAN, OF DANVILLE, ILLINOIS.

KILN FOR BURNING CLAY PRODUCTS AND THE LIKE.

1,147,117.        Specification of Letters Patent.      Patented July 20, 1915.

Application filed January 3, 1914. Serial No. 810,123.

*To all whom it may concern:*

Be it known that I, GEORGE W. OGAN, a citizen of the United States, residing at Danville, in the county of Vermilion and State of Illinois, have invented certain new and useful Improvements in and Relating to Kilns for Burning Clay Products and the like, of which the following is a specification.

This invention relates to certain improvements in kilns; and the objects and nature of the invention will be readily understood by those skilled in the art in the light of the following explanation of the accompanying drawings illustrating what I now believe to be the preferred embodiments and mechanical expressions from among other constructions and arrangements within the spirit and scope of my invention.

An object of the invention is to provide means and arrangements, in kilns for burning articles of clay or equivalent material, designed to produce uniform burning of all of the clay articles in a kiln, and hence to raise to the maximum the percentage of perfectly fired or burned articles produced at each firing.

A further object of the invention is to provide kilns for firing articles of clay and the like, with improvements designed to maintain an approximately uniform temperature throughout all portions of the mass or piles of clay articles during the burning process.

A further object of the invention is to provide a kiln having a compartment or chamber with burners discharging thereinto, and passages or flues to produce an up draft through the articles to be burned in one portion of the chamber and a down draft through the articles to be burned in another portion of said chamber, and additional burners discharging into said compartment to support or supplement combustion or to supply heated products in or above said articles, with the end in view of attaining uniform firing or burning of all said articles in said compartment.

A further object of the invention is to provide certain improvements in arrangements and combinations of flues and burners with the end in view of providing a highly efficient and advantageous kiln for burning articles of clay or other material.

The invention consists in certain novel features in construction and in combinations and arrangements as more fully and particularly set forth and pointed out hereinafter.

Referring to the accompanying drawings;—Figure 1, is a side elevation of a portion of a multi-compartment kiln embodying my invention. Fig. 2, is a horizontal longitudinal section taken approximately in the plane of the line 2—2, Fig. 3. Fig. 3, is a vertical longitudinal section taken approximately in the plane of the line 3—3, Fig. 2. Figs. 4, 6 and 7, are vertical cross sectional views taken, respectively, in the planes of the lines 4—4; 6—6; 7—7, Fig. 3. Fig. 5, is a vertical cross section on the line 5—5, Fig. 2. Fig. 8, is vertical longitudinal section in the plane of one of the flues 15, Fig. 2. Fig. 9, is a bottom perspective of one of the floor tiles over the transverse flues between the down draft or depressed burners. Fig. 10, is a horizontal section of a single compartment kiln. Fig. 11, is a vertical section on the line 11—11, Fig. 10. Fig. 12, is a horizontal section on the line 12—12, Fig. 11. Fig. 13, is a vertical section on the line 13—13, Fig. 10.

The multi-compartment kiln comprises suitable inclosing walls, a floor, and a roof or top, and the inclosing walls include a pair of opposite side longitudinal walls 1. The interior of the kiln is divided into usually similar compartments by transverse partition walls 2, joining the side walls 1, and extending from the ceiling or roof to the foundation, and each partition or transverse wall is preferably imperforate except at its lower portion to prevent direct communication between the compartments except between their lower portions under certain conditions.

In the particular example illustrated, I show two transverse walls 2, uniformly spaced from each other and from the end walls of the kiln and dividing the interior of the kiln into three compartments A, B, C, but I wish it distinctly understood that my invention is not so limited and that I show three compartments merely as a convenient number for purposes of illustration. The kiln can be composed of any number of compartments, although as at present advised by experience, I deem it inadvisable to build a multi-compartment kiln under this particular form of my invention having less than three compartments.

In the example illustrated, all of the compartments A, B, C, are provided with a horizontal floor 3, to support the articles to be burned, and this floor is elevated a distance above the foundation or ground line or level 4, to provide for various flues or passages beneath the floor as hereinafter recited. Each compartment of the kiln is provided with one or more side doors 5, through which the compartments can be filled and emptied as will be understood by those skilled in the art.

Each compartment is designed to have the articles to be burned stacked or piled on the floor 3, to approximately fill the compartment to a certain height, preferably so as to leave a longitudinal combustion space or passage *a*, above the mass of articles to be burned and below the ceiling or roof, and also to have the articles to be burned so stacked or piled as to provide a vertical deflecting screen or partition (indicated by dotted lines *b*) arranged centrally across the compartment from side wall to side wall and extending from the floor up to said top open space *a*. This deflecting screen is preferably temporary or removable, and is usually formed when the compartment is filled and removed when the compartment is emptied, and hence is preferably composed of the articles to be burned.

The temporary screen or partition is designed to transversely subdivide the mass of articles to be burned (in other words, the "work") into two bodies or sections and to cause the draft from one end of the compartment toward the other end thereof, to pass up through one body or section of the work, and longitudinally of the compartment through the space *a*, above the deflecting partition, and then down through the other body or section of the work at the opposite side of said deflecting partition.

Suitable down draft burners are provided at the front end portion of each compartment, to maintain the heat or combustion within the updraft end or portion of the compartment, while suitable updraft burners are provided to discharge heated or burning products into the combustion space *a*, and thus supplement the heated products from the first mentioned burners, and maintain the desired temperature in the mass of articles to be burned in the downdraft portion of the compartment. The design of the structure is to maintain the desired burning temperature equally throughout all portions of the two stacks of articles to be burned on opposite sides of the deflecting screen or partition *b*. In the particular example illustrated, each compartment is provided with a depressed combustion chamber or passage *c*, arranged below the floor 3, and extending transversely across the kiln from one side wall to the other at the inlet or front end portion of the compartment, and suitable burners are provided at the opposite ends of this passage *c*, to discharge burning fluids or products thereinto. For instance, I show depressed so-called downdraft furnaces 6, arranged in the opposite side walls of the kiln and operative from the exterior thereof through doors, draft controlling means, and openings $6^a$, and discharging directly into the opposite ends of said passage *c*. However, as at present advised by experience, I do not wish to limit myself to burners for maintaining the heat in passage *c*, formed by furnaces 6, such as shown.

Suitable means are provided for discharging the hot or burning products or fluids from the passage *c*, through the floor 3, so as to uniformly distribute the same throughout the mass of articles piled on said floor at the updraft side of the temporary screen or partition *b*. For instance, I provide series of parallel longitudinal flues 7, below the floor 3, and opening laterally into and extending in opposite directions from the passage *c*, and uniformly distributed from one side of the kiln to the other and having top openings 8, through the kiln floor for the upward discharge of the hot or burning products into the stack of articles on said floor. The hot or burning products are drawn laterally from the passage *c*, through said flues 7, and are discharged upwardly therefrom through the outlets 8, and these outlets are uniformly distributed throughout the area of the floor at the updraft side or portion of the compartment.

The flues 7, below the door 3, of the kiln are formed by or are located between longitudinal spaced walls 9, built up from or laid on the ground or other foundation 4, and supporting the floor 3. This floor comprises brick, tile or other suitable material laid or resting on the top edges of the walls 9, and covering the spaces between said walls except where draft openings in said floor are provided. These longitudinal walls 9, beneath the floor of a compartment terminate at the opposite longitudinal sides of the combustion passage *c* of said compartment, and the longitudinal spaces or flues between said walls 9, open at their ends into the passage *c*, and receive the hot products therefrom. If so desired, two longitudinal walls 9, located about centrally between the kiln side walls can be extended part way across the passage *c*, to form obstructions $9^a$, at and partially closing the central portion of said passage to tend to equalize the draft on said two burners through the passage.

If so desired, the portion of the floor of the compartment over and constituting the top wall of the passage *c*, can be formed by a series of horizontal overlapping refractile material blocks $3^a$, resting on and supported by vertical walls of the passage and flues beneath the floor. Each block can be formed with a concavity 3ᵇ, extending across its bottom to form a portion of the arched ceiling of the passage c, and a concavity 3ᶜ, extending across its bottom at right angles to the concavity 3ᵇ, and of a reduced radius with respect thereto to form and provide the opposite side outlets from the passage c, to the longitudinal flues 7.

The formation of the under side of the block 3ᵃ, with the concavities arranged at right angles to each other, provides depending supports or pillars at the four corners. These pillars rest on the top edges of the walls forming the sides of passage c, and support the block. I wish it understood, however, that I do not wish to limit my invention to the particular blocks described for covering the passages c, as other means can be employed for this purpose.

The rear or right hand ends of the updraft distributing flues 7, extending from the right hand side of a transverse passage c, are closed by a transverse vertical wall 11, rising from the foundation and extending to the floor 3, and preferably located in the same vertical plane as and forming a downward continuation of the temporary deflecting screen or partition b, and in fact indicating the line along which said partition should be erected in filling the compartment with the articles to be burned.

The left hand ends of the updraft distributing flues 7, extending from the opposite or left hand side of passage c, are closed either by the left hand end wall 11ᵃ, of the kiln (in the first compartment A) or in the remaining compartments, by a transverse vertical wall 11ᵇ, closing the space between the foundation 4, and the kiln floor 3.

The transverse passage c, of a compartment is spaced from the walls 11 and 11ᵇ (or 11ᵃ) and is arranged between said walls so that the flues 7, extend in opposite directions from said passage and to said walls and have a multiplicity of top outlets 8, through the floor 3, above the flues. These outlets 8, are approximately uniformly distributed throughout the portion of the floor of a compartment between the kiln side walls and the depressed walls 11 and 11ᵇ (or 11ᵃ) to cause uniform updraft through the mass of articles to be burned located to the left of the deflecting partition b, and uniform heating of said portion of the floor and of the articles thereon.

The outlet or down draft portion or end of each compartment is located to the right of the deflecting partition b, of the compartment, and longitudinal downward suction or outlet flues 12, are arranged below the floor 3, of said portion of the compartment and formed between the longitudinal walls 9. Said portion of the floor of the compartment between the deflecting partition b, the compartment end wall 2, and the kiln side walls, is formed with a multiplicity of suction or outlet openings 8ᵃ, into the flues 12, and approximately uniformly distributed throughout the area of said portion of the floor 3. The series of parallel suction or down draft flues 12, of a compartment, extend from the transverse depressed central wall 11, of such compartment to the transverse depressed front end wall 11ᵇ, of the next compartment and said flues are closed at their ends by said transverse walls. In other words, said wall 11 cuts off the inlet or updraft flues 7, of a compartment from direct communication with the corresponding suction, outlet or down draft flues 12, of such compartment, while the depressed transverse wall 11ᵇ, of a compartment cuts off the inlet or updraft flues 7, of that compartment from direct communication with the suction or outlet flues 12, of the next compartment to the left.

The draft through the kiln is maintained by a suitable stack or fan (not shown) or both, communicating with a main outlet flue D, usually arranged under ground and longitudinally of the kiln and having (usually underground) branch outlet or draft flues d, opening thereinto and extending laterally therefrom to points beneath the kiln floor, into communication with the suction or down draft flues 12 of the compartments, respectively.

Each branch draft flue d, is provided with a damper d′, operative from the exterior of the kiln, for independently closing or opening direct communication between such compartment and the main draft flue. The branch flues d, extend, usually, in the form of tunnels, transversely of the compartments below the floors thereof and intersect all of the suction flues 12, of such compartments and open directly thereinto.

The depressed flue d, of a compartment is located beneath the down draft side of the compartment usually approximately midway between the depressed transverse wall 11 of the compartment and the base of the right hand end wall 2, of such compartment, and is formed with an arched top constituting a floor support and throughout its length having longitudinal series of spaced opposite side or lateral openings into the series of spaced longitudinal suction flues 12, so that the air and gaseous products will be drawn into flue d, from flues 12, and thereinto through outlets 8ᵃ, from the bottom of the down draft portion of the compartment.

I usually arrange a horizontal longitudinal deflector or partition d², in each flue d, below the lateral openings therein from flues 12, adjacent the outlet end of said flue d, for the purpose of equalizing the suction on or the draft in the several flues 12, with the end in view of causing the flue $d$, to draw uniformly on all of the flues 12, opening thereinto.

To aid in maintaining the desired approximately uniform temperature throughout all portions of the stacks of articles to be burned on both sides of the deflecting partitions $b$, of the compartments, I provide each compartment with several spaced longitudinal updraft flues 15, beneath the floor of the compartment and extending from and opening into the combustion passage $c$, under the updraft portion of such compartment, to outlet or up draft openings 16, through the floor of the down draft side or portion of said compartment. These flues 15 are designed to convey hot or burning products beneath the floor of the compartment and drawn from passage $c$, and to discharge the same upwardly through the floor and into the mass of articles in the down draft side of the compartment. The flues 15, are preferably formed between certain pairs of longitudinal walls 9, and the transverse bottom walls 11, are formed with transverse openings coinciding with said flues 15, so that said flues are continuous through said walls. The updraft outlets 16 for these flues of a compartment are preferably arranged in a row across the compartment approximately centrally above the underground draft flue or tunnel $d$ of such compartment. The flues 15, of a compartment are arranged in line with the closed portions of the top arch of said draft tunnel or flue $d$, that is, between the outlets from the exhaust or suction flues 12, into said draft tunnel, so that the ends of the flues 15, are in effect closed by the imperforate portions of the arch of said tunnel.

The kiln is provided with suitable furnaces or other burners, in addition to burners 6, to discharge hot or burning products into the compartments somewhere between the updraft and down draft portions of the floor of each compartment. Each compartment can be provided with any suitable number of such furnaces, although in the example illustrated, I show each compartment provided with a pair of such additional burners arranged opposite each other in the side walls of the compartment. For instance, I show each compartment provided with elevated up draft furnaces 20, arranged in and extending through the opposite side walls of the kiln and operative from the exterior thereof and provided with any suitable exterior doors, dampers, or other controlling means. At their inner ends, these furnaces 20, discharge into suitable vertical bag walls 21, arranged at the opposite inner sides of the compartment and opening and discharging at their upper ends into the upper portion of the interior of the compartment usually into the combustion chamber or space $a$, above the mass of articles in said compartment, and preferably, although not necessarily into the upper part of the down draft side or portion of the chamber.

In order to place the compartments in direct communication so that the products and heated gas or air can be drawn from one compartment to and through the adjoining compartment and if desired therefrom through other compartments in succession, the down draft or longitudinal depressed discharge flues 12, of a compartment are continued through the base of the right hand end wall 2, of such compartment and a short distance beneath the floor of the next compartment, that is up to the transverse bottom wall $11^b$, of said next compartment.

The partitions 2, of the kiln are formed with transverse vertical openings $2^a$, coinciding with flues 12, and extended upwardly above the level of the kiln floor to place adjoining compartments in communication and these openings $2^a$, are extended horizontally in the kiln floor and into the flues 12, to provide outlets therefrom into the inlet or updraft end of the adjacent compartment. The depending or base portions of the partitions 2, below the floor level coincide with and are virtually continuations or portions of the longitudinal walls 9, beneath the kiln floor.

In operating a multi-compartment or continuous kiln, several successive compartments will be in simultaneous operation but at different stages of the process, and the heated products will be drawn from one compartment to the other. For instance, if all three compartments A, B, C, of the particular example illustrated, should be filled with articles to be burned and should be in simultaneous operation but at different stages, the dampers $d'$ in the branch draft tunnels $d$, to compartments A and B, would be closed and the branch tunnel $d$, to compartment C, would be open and the pull or suction of the exhaust fan or stack would be concentrated on the branch draft tunnel $d$, of said compartment C, and the gaseous products would be drawn from the down draft side of compartment C through the outlet openings $8^a$, and discharge flues 12, thereof, and the products would be drawn down through the pile of articles on the right hand side of deflecting partition $b$, and from the space $a$, in the top of compartment, and up through the pile of articles on the left hand side of partition $b$, and up through the updraft openings 8, and flues 7, from the burner passage $c$, if the burners 6 are in operation. The products from the compartment B, would be drawn therefrom and into compartment C through the openings $2^a$, in the partition 2, and from the longitudinal flues 12 of said compartment B. This would cause the desired down draft through the articles to the right of partition $b$ and updraft through the articles to the left of partition $b$, in compartment B and through the openings $2^a$ in partition 2, from the compartment A, in which the up and down draft will be maintained as just described in connection with the compartments B, and C.

In starting the operation in a compartment, such as A, the compartment is filled with the articles to be burned on both sides of the deflecting partition $b$, so that said articles will be approximately evenly distributed throughout the floor of the compartment. The passages $2^a$, whereby the discharge end of compartment A, can be placed in communication with the inlet end of compartment B, are suitably closed or sealed by sheets of paper, canvas or other combustible impervious material. The fires or burners 6 and 20, are set in operation and the desired draft is set up through the draft tunnel D and its branch $d$, to the compartment A. The hot or burning products from the burners 6, are distributed approximately uniformly under the portion of the floor at the updraft side of the compartment to maintain the same approximately uniformly heated throughout, and said burning products are discharged upwardly through the openings 8, to cause the required temperature to be maintained uniformly throughout the mass of articles to the left of the partition $b$. The draft is longitudinally of the compartment through the space $a$, and the desired temperature is kept up in the space $a$ by the hot or burning products discharged thereinto from behind the bag walls 21, of the furnaces or burners 20. The burning products are drawn from the space $a$, down through the mass of articles to the right of the partition $b$, and the desired high temperature is maintained approximately uniformly throughout said articles by the uniform distribution of the outlet openings $8^a$, into the outlet flues 12, that discharge into the exhaust tunnel $d$. The flues 12 are uniformly distributed at the down draft side of the compartment to cause a uniform distribution of the heat in the lower portion of the pile of articles at the down draft side of the compartment, and this uniform heating of the floor at the down draft side of the compartment and of the lower portion of the mass of articles thereon, is aided by the several spaced longitudinal depressed flues 15, extending direct from the combustion passage $c$, of the compartment and discharging heated products therefrom upwardly through the updraft ports 16, into said mass of articles. The heated products from the down draft burners 6, are drawn through the piles of articles at both sides of the deflecting partition and hence through the entire compartment while the heated products from the updraft furnaces 20, are drawn through only part of the compartment and are utilized to build up the temperature at the top of the compartment and at the down draft side or end thereof to the desired temperature such as existing at the updraft side of the compartment. The lower or down draft burners 6 are utilized to maintain the desired high temperature at or in the bottom or floor portion of the compartment while the furnaces or burners 20, are utilized to aid in maintaining said high temperature in the top and down draft portions of the compartment. The object being to maintain the desired burning temperature approximately uniform throughout the entire mass or masses of articles in the compartment to attain perfect uniform burning of all articles in the compartment, and thereby attain a very high percentage of perfect products at each burning.

When the stage in the process has been reached in the compartment A, rendering it desirable to draw the heated products therefrom through compartment B, the damper $d'$, in the draft tunnel $d$, to compartment A, is closed, and a damper $d'$ in a tunnel $d$, to a compartment to the right is opened. The heat accumulating in compartment A, will then cause the paper or canvas closing the passages $2^a$, from compartment A, to be consumed so as to open said passages and place compartment A, in direct communication with compartment B, with the results hereinbefore described.

In Figs. 10 to 13, of the drawings, I show certain features of my invention applied to a single compartment kiln, in this instance, a round kiln. This kiln is formed with any suitable inclosing or surrounding wall 30, and with a floor 31, on which the articles to be burned are piled. These articles are so stacked on the floor as to form a vertical deflecting screen or partition $b$, extending completely across and approximately centrally of the kiln and from the floor up to the open or combustion space above the mass of articles and below the kiln ceiling. This partition is preferably composed of articles to be burned and is built when the green articles are stacked in the kiln and is removed with the fired or burned articles. This partition divides the mass of articles to be burned into one portion at the updraft side of the kiln and another portion at the down draft side of the kiln. In the wall 30 at the down draft side of the kiln, I arrange a number of furnaces or other burners 32, suitably spaced apart and operative from the exterior of said wall and opening and discharging inwardly into a manifold or distributing passage or chamber 33, arranged under the floor 31, at the down draft side of the kiln and extending along the inner side of the wall 30. A series of parallel flues 34, is arranged immediately under the kiln floor and these flues open into said distributing passage 33 and extend therefrom to the updraft side of the kiln. The flues extend completely across the kiln and are spaced apart and uniformly distributed throughout the kiln bottom under the down and up draft floor portions. The flues extend under the down draft portion of the floor and are closed at the top thereby. The up draft portion of the floor however, is formed with updraft ports or openings 35, from said flues 34, and into the updraft side of the kiln. These openings are usually spaced apart and arranged in series of rows longitudinally and transversely of the kiln floor so as to be uniformly distributed throughout the area of the portion of the floor located to the right (in the illustration) of the deflecting partition $b$. The portion of the kiln floor to the left of partition $b$, constitutes the floor of the downdraft side of the kiln or compartment, and said portion of the floor is formed with spaced exhaust or outlet ports or openings 36, uniformly arranged throughout the area thereof usually in series of rows at right angles to each other. The exhaust ports 36, open into spaced draft or exhaust flues 37 arranged below said floor and parallel with and between the flues 34, but cut off from direct communication therewith, and also cut off from direct communication with the distributing passage 33, although approximately extending from the wall thereof to the center of the kiln bottom and there opening and discharging into an underground draft or discharge tunnel or flue 38, arranged below the floor of the kiln and longitudinally with respect to or in the same vertical plane as the deflecting partition $b$. A main draft tunnel or depressed passage 39 opens into the center of the transverse tunnel 38, and extends therefrom to a suitable exterior stack or other draft creating outlet (if so desired) provided with a suction fan (not shown). The draft tunnel 38 intersects all of the exhaust flues 36, so that the series of openings from said flues into said tunnel is arranged longitudinally of and approximately throughout the length of the tunnel. Said flues usually open downwardly into the top portion of the tunnel between longitudinal walls under and supporting the kiln floor, and the flues 34 are also formed between certain of said longitudinal walls. The flues 34 extend across the draft tunnel 38 and are closed from direct communication therewith. At the updraft side of the kiln I provide a suitable number of spaced updraft furnaces or other suitable burners 40, opening through the kiln wall and operative and controlled from the exterior of the kiln and at their inner ends opening and discharging into the interior of the kiln behind vertical bag walls 41. The spaces behind the bag walls open into the upper part of the interior of the kiln usually above the stacks of articles to be burned. The hot or burning products are drawn from the furnaces 32, into the distributing passage 33, and therefrom under the kiln floor through flues 34 and upwardly through ports 35, into the bottom part of the mass of articles at the updraft side of the kiln. The burning or hot products are drawn up through said articles and laterally above the deflecting partition and then down through the mass of articles at the down draft side of the kiln and out through openings or ports 36, flues 37, and tunnels 38, and 39. The heat or combustion is kept up and reinforced in the upper and down draft portions of the kiln by the up draft burners 40, as will be readily understood from the description of the multi-compartment kiln. The advantages of the various flues under the floor of the kiln and opening therethrough will also be understood from the description of the multi-compartment of the kiln, as the desirable uniform heating and uniform burning is also attained in the round or single compartment kiln. To attain uniform distribution of heated products in and draft through the various flues 34, I usually arrange obstruction 33′ in distributing passage 33, so that each furnace 32, will serve certain flues 34.

It is evident that various modifications, variations, changes, omissions, and additions might be resorted to with respect to the particular examples illustrated, without departing from the spirit and scope of my invention and hence I do not wish to limit myself to the exact disclosure hereof.

What I claim is:—

1. A kiln compartment having an area of its floor formed with up draft openings, flues distributed under said floor and extending to said openings, burners in communication with said flues, another area of said floor having down draft or exhaust openings, exhaust flues from said exhaust openings, an exhaust passage communicating with said exhaust flues, and additional burners arranged to discharge into the upper portion of said compartment, substantially as described.

2. A kiln having a compartment to receive the articles to be fired, a floor on which said articles are adapted to be supported, said kiln arranged to provide an updraft through the articles in one portion of said compartment and a down draft through the articles in another portion of said compartment, a system of floor-heating flues arranged below said floor and discharging upwardly therethrough into the up draft portion of said compartment, heating means for and common to all of said flues and arranged below said floor, a system of exhaust flues arranged below said floor and having exhaust openings from the down draft portion of said compartment, an exhaust passage common to said exhaust flues, and arranged below said floor, and additional heating means opening into the upper portion of said compartment.

3. A kiln having means to maintain an updraft through one portion of a compartment adapted to receive the articles to be burned and into a combustion space at the top of said compartment and a down draft from said space through another portion of said compartment, burners discharging into said updraft side of the compartment, and additional burners discharging into said combustion space, substantially as described.

4. A kiln compartment having an area of its floor formed with up draft openings uniformly distributed throughout said area, heating flues distributed under said floor and extending to said openings, means for uniformly supplying burning products to said flues, the remaining area of said floor having down draft or exhaust openings uniformly distributed therein, exhaust flues from said exhaust openings, and an exhaust passage common to and communicating with said exhaust flues, certain heating flues having updraft discharge openings through the down draft area of said floor.

5. A kiln having a compartment to receive the articles to be fired, a floor on which said articles are adapted to be supported, said kiln arranged to provide an updraft through the articles in one portion of said compartment and a down draft through the articles in another portion of said compartment, a system of uniformly-distributed floor-heating flues arranged below said floor and discharging upwardly therethrough into the up draft portion of said compartment, a transverse passage for supplying hot products uniformly to all of said flues, a system of uniformly-distributed exhaust flues arranged below said floor and having exhaust openings from the down draft portion of said compartment, and an exhaust passage common to said exhaust flues.

6. A kiln having a transverse passage below the kiln floor, burners at both ends of and discharging into said passage, a series of spaced floor heating flues arranged below the floor transversely of and opening into said passage and having discharge openings upwardly through said floor, a draft or outlet passage, and series of exhaust flues arranged below said floor transversely with respect to said outlet passage and discharging laterally thereinto and provided with inlet ports opening vertically through said floor.

7. A kiln having a transverse passage arranged below the kiln floor and at its top closed thereby, burners operative from the exterior of the kiln, and discharging into said passage, a system of floor heating flues distributed beneath said floor and having discharge openings extending vertically through said floor and uniformly distributed throughout the updraft area of said floor, said passage discharging into said system of flues, and an exhaust system of flues beneath the floor of the kiln and having outlet ports from the kiln opening vertically through said floor and uniformly distributed throughout the down draft area of said floor.

8. A kiln having a distributing passage beneath its floor, furnaces discharging into said passage, said floor comprising an updraft area and a down draft area, floor heating flues arranged below the floor and transversely with respect to and opening into said passage to draw hot products therefrom and having a multiplicity of discharge ports spaced apart and opening vertically through said up draft area of the floor and means for maintaining the up and down draft through the kiln comprising a multiplicity of exhaust ports spaced apart and opening vertically through said down draft area of the floor.

9. A kiln having its floor divided into an up draft area formed with inlet ports uniformly distributed throughout said area and a down draft area formed with exhaust ports uniformly distributed throughout said area, burners in communication with and supplying heated products to said inlet ports, draft maintaining means in communication with said exhaust ports for drawing the products downwardly therethrough, and burners discharging heated products into the kiln above said floor areas, for the purpose substantially as described.

10. A kiln having a compartment adapted to receive stacks of articles to be burned, said compartment having a floor on which said stacks are piled, said stacks including and divided by a removable vertical deflecting screen into an up draft portion at one side of the screen and a down draft portion at the other side of the screen, said stacks adapted to be so arranged as to provide an upper combustion space below the ceiling of the compartment and above said portion of the articles, means to distribute hot gaseous products upwardly through said floor into the up draft portion of said stack of articles, means to exhaust the gaseous products downwardly through said floor under said down draft portion of said articles, and burners discharging hot gaseous products directly into said space above the stacks of articles.

11. A kiln having a compartment provided with a floor, the articles to be burned adapted to be stacked in said compartment and on said floor so that the draft will be up through the articles at one side of the compartment, across the upper portion of the compartment and down through the articles at the other side of the compartment, furnaces operative from the exterior of the kiln and extending to the interior of the kiln, the kiln being interiorly provided with vertical bag walls whereby the products from said furnaces are discharged into said upper portion of said compartment, means for supplying hot gaseous products upwardly through said floor into the articles at the up draft side of the compartment, and means for exhausting hot gaseous products downwardly through the floor and from the down draft side of the compartment.

12. A kiln having a compartment in which the articles to be burned are stacked so as to provide an up draft portion and a down draft portion and a combustion space above said portions, said compartment having a floor on which said articles are stacked, said floor having vertical inlet openings uniformly distributed throughout the area below said up draft portion of the stack of articles, said floor also having vertical exhaust openings uniformly distributed throughout the area below said down draft portion of the stack of articles, means for supplying hot gaseous products into said compartment through said inlet openings, means for exhausting gaseous products from said compartment downwardly through said exhaust openings, and means for supplying hot gaseous products directly into said combustion space and independently of said inlet openings.

13. A kiln having a compartment in which the articles to be burned are stacked to provide an up draft portion and a down draft portion with a combustion space above said portions, said compartment having a floor on which said articles are stacked, said floor having vertical inlet openings approximately uniformly distributed throughout the area below said up draft portion of the stack of articles and also having inlet openings arranged about centrally of the area of the floor below said down draft portion of the stack of articles, said floor also having exhaust openings arranged approximately uniformly throughout the area below said down draft portion of the stack of articles, means for exhausting gaseous products from said chamber downwardly through said exhaust openings, and means for supplying hot gaseous products into said compartment through said several inlet openings.

14. A kiln having a floor on which the articles to be burned are stacked, an area of said floor having inlet ports opening vertically therethrough and distributed approximately uniformly therein, another area of said floor having vertical exhaust ports opening downwardly therethrough and approximately uniformly distributed, parallel flues approximately uniformly distributed under said floor, said inlet ports opening into certain of said flues, said outlet ports opening into other of said flues, means for maintaining combustion, and draft maintaining means.

15. A kiln having several successive compartments, partitions between the compartments, said compartments having floors, said partitions having transverse openings at their lower portions extending above the floor and whereby the compartments can be placed in direct communication with each other, each compartment having depressed burners and flues therefrom opening upwardly through an area of the compartment floor, exhaust flues below the compartment floor having exhaust openings through another area of said floor, means for maintaining the draft through said exhaust flues and from said compartment, and additional burners discharging into the upper portion of said compartment.

16. A single compartment kiln having a floor divided into an up draft area and a down draft area, flues approximately uniformly distributed under said floor beneath both areas thereof and having vertical discharge openings through the up draft area, exhaust flues arranged under the floor and having exhaust openings through the down draft area of the floor, means for supplying hot gaseous products to said first mentioned flues, and a draft passage common to said exhaust flues.

In testimony whereof I affix my signature in presence of two witnesses.

GEORGE W. OGAN.

Witnesses:
JOHN D. DICKSON,
EARL OGAN.